United States Patent
Cottingham et al.

(10) Patent No.: US 8,924,371 B2
(45) Date of Patent: Dec. 30, 2014

(54) SEARCH-SORT TOGGLE

(75) Inventors: Heather Cottingham, San Francisco, CA (US); Anthony Chad Sampanes, Redwood City, CA (US); Brent-Kaan William White, San Francisco, CA (US)

(73) Assignee: Oracle International Corporation, Redwood Shores, CA (US)

( * ) Notice: Subject to any disclaimer, the term of this patent is extended or adjusted under 35 U.S.C. 154(b) by 422 days.

(21) Appl. No.: 12/792,571

(22) Filed: Jun. 2, 2010

(65) Prior Publication Data

US 2011/0302177 A1 Dec. 8, 2011

(51) Int. Cl.
*G07F 17/30* (2006.01)
*G06F 17/30* (2006.01)
*G07F 7/00* (2006.01)

(52) U.S. Cl.
CPC .............................. *G06F 17/30991* (2013.01)
USPC .......................................... 707/706; 707/722

(58) Field of Classification Search
None
See application file for complete search history.

(56) References Cited

U.S. PATENT DOCUMENTS

| | | | |
|---|---|---|---|
| 6,421,675 B1 | 7/2002 | Ryan et al. | |
| 6,625,595 B1 | 9/2003 | Anderson et al. | |
| 6,718,324 B2 | 4/2004 | Edlund et al. | |
| 7,139,762 B2 | 11/2006 | Labarge et al. | |
| 7,369,102 B2 | 5/2008 | Luke et al. | |
| 7,370,047 B2 | 5/2008 | Gorman | |
| 7,765,227 B1 * | 7/2010 | Khoshnevisan et al. | 707/769 |
| 2002/0120604 A1 * | 8/2002 | Labarge et al. | 707/1 |
| 2003/0036927 A1 | 2/2003 | Bowen | |
| 2006/0069915 A1 * | 3/2006 | Koeda | 713/168 |
| 2007/0061335 A1 | 3/2007 | Ramer et al. | |
| 2010/0211535 A1 * | 8/2010 | Rosenberger | 706/20 |
| 2011/0296463 A1 * | 12/2011 | Suslov | 725/44 |

OTHER PUBLICATIONS

Nudelman, Greg; "The Mystery of Filtering by Sorting"; obtained at http:www.uxmatters.com/mt/archives/2009/07/the-mystery-of-filtering-by-sorting.php; Jul. 6, 2009, 15 pages.
Add-on for Firefox; obtained at https:/addons.mozilla.org/en-US/firefox/browse/type:4; Oct. 9, 2009; 2 pages.
Aperture 2 100+ new features—obtained at http://www.apple.com/fr/aperture/features/100.html; Oct. 9, 2009; 5 pages.

* cited by examiner

*Primary Examiner* — Usmaan Saeed
*Assistant Examiner* — Yu Zhao
(74) *Attorney, Agent, or Firm* — Trellis IP Law Group, PC

(57) ABSTRACT

Method and system for facilitating accessing or retrieving desired data via use of graphically displayed search/sort toggle functionality. The method includes providing a first user option to toggle between display of a search control and a sort control. Search results are displayed in response to user input provided via the search control. Default search results may be initially displayed. A portion of the search results may be displayed simultaneously with one or more controls associated with the first user option.

8 Claims, 8 Drawing Sheets

SEARCH-SORT TOGGLE

BACKGROUND

This application relates in general to information access and retrieval and more specifically to systems and methods for searching, sorting, and displaying data.

Systems for facilitating access to and display of information are employed in various demanding applications, including Internet-based search engines, enterprise databases, file systems, and so on. Such applications often demand fast and efficient mechanisms for searching data and concisely displaying desired results.

Systems and methods for concisely displaying desired results are particularly important in mobile computing applications, where small screen sizes often limit efficient viewing of large amounts of returned data, e.g., search results. As mobile computing applications advance, larger amounts of data are being accessed with progressively smaller displays, such as displays employed on pocket Personal Computers (pocket PCs), miniature laptops, portable MP3 players, and so on.

For example, a user may employ a mobile-computing device, such as a Web-enabled cellular telephone, to perform an Internet-based search, such as via Google, or to perform another type of search, such as a search of an enterprise database. Unfortunately, accessing desired data may require scouring large lists of returned search results. Such scouring of returned results is particularly problematic when using small display screens. Further refinement of search results may require performing another search with additional criteria, such as by selecting advanced-search options. Unfortunately, accessing advanced search criteria often requires navigating away from previously generated search results, and a user may loose the context of the original search.

Similarly, a user that employs an MP3 player to search for songs on the MP3 player may need to sift through many titles to uncover the desired song, which is particularly problematic when using very small display screens.

SUMMARY

An example method for facilitating access to desired data includes providing a first user option to toggle between display of a search control and a sort control. Search results are displayed in response to user input provided via the search control. Note that default search results may be initially displayed before a user employs the search control. A portion of the search results may be displayed simultaneously with one or more controls associated with the first user option.

The example method further includes displaying search results simultaneously with one or more sort controls in response to user selection of the first option, i.e., toggle, when one or more search controls are initially displayed. Hence, display of search and sort controls may be toggled via the first option while any search results are simultaneously displayed along with the controls.

Sort controls are adapted to enable a user to specify one or more sort criteria for sorting data, such as displayed search results. Similarly, search controls enable specification of one or more search criteria or queries. In a specific embodiment, the first user option includes a search toggle button and a sort toggle button. Alternatively, a single button is provided for toggling between display of sort and search controls that facilitate access to sort and search functionality, respectively.

Certain embodiments disclosed herein are particularly useful for concisely displaying desired results via computing devices employing relatively small display screens. Note that unlike certain embodiments disclosed herein, conventionally, implementing a search and then further refining the search often required performing a separate search. Generally, the related art is deficient in providing efficient ways to switch between searching and sorting operations while displaying any previously obtained search results. Consequently, a user may forget what the search results were when deciding how to sort the search results in a subsequent sorting operation, i.e., the user loses context.

Certain embodiments disclosed herein overcome these problems by allowing easy access (via one or more graphically displayed controls) to both search and sort functionality via one or more toggle controls, thereby enabling a user to quickly sort previously returned search results based on desired criteria. This enables a user to readily access desired information, which may appear at the top of returned search results after the search results are sorted. This may further reduce or obviate the need to navigate large amounts of data to access the desired results. This further enables a user to more readily spot desired data within a limited viewing area. Furthermore, by efficiently switching between search and sort functionality while maintaining search results in view, users more readily retain the context of their previous search.

While certain conventional methods may enable simultaneous searching and sorting operations, such methods often require display of extra controls, or the sorting options cannot be directly chosen by the user. This requirement may undesirably limit screen real estate. Furthermore, a user may wish to first see search results to better determine how to sort the search results before performing a given sort of the search results. Certain embodiments disclosed herein meet these needs by enabling a user to employ one or more toggle switches to switch between controls for search and sort.

A further understanding of the nature and the advantages of particular embodiments disclosed herein may be realized by reference of the remaining portions of the specification and the attached drawings.

DETAILED DESCRIPTION OF EMBODIMENTS

Although the description has been described with respect to particular embodiments thereof, these particular embodiments are merely illustrative, and not restrictive.

For example, while the present application is discussed with respect to graphical display of information in a relatively small screen of a mobile computing device that runs client-side user-interface software, embodiments are not limited thereto. Those skilled in the art with access to the present teachings may readily adapt embodiments disclosed herein to various different applications and computing environments without undue experimentation and without departing from the scope of the present teachings. For example, certain embodiments may work with any size display screen and may be implemented via a remote server or via a distributed computing application, without departing from the scope of the present teachings.

For clarity, certain well-known components, such as hard drives, operating systems, power supplies, and so on, have been omitted from the figures. However, those skilled in the art with access to the present teachings will know which components to implement and how to implement them to meet the needs of a given application.

Figure 1:
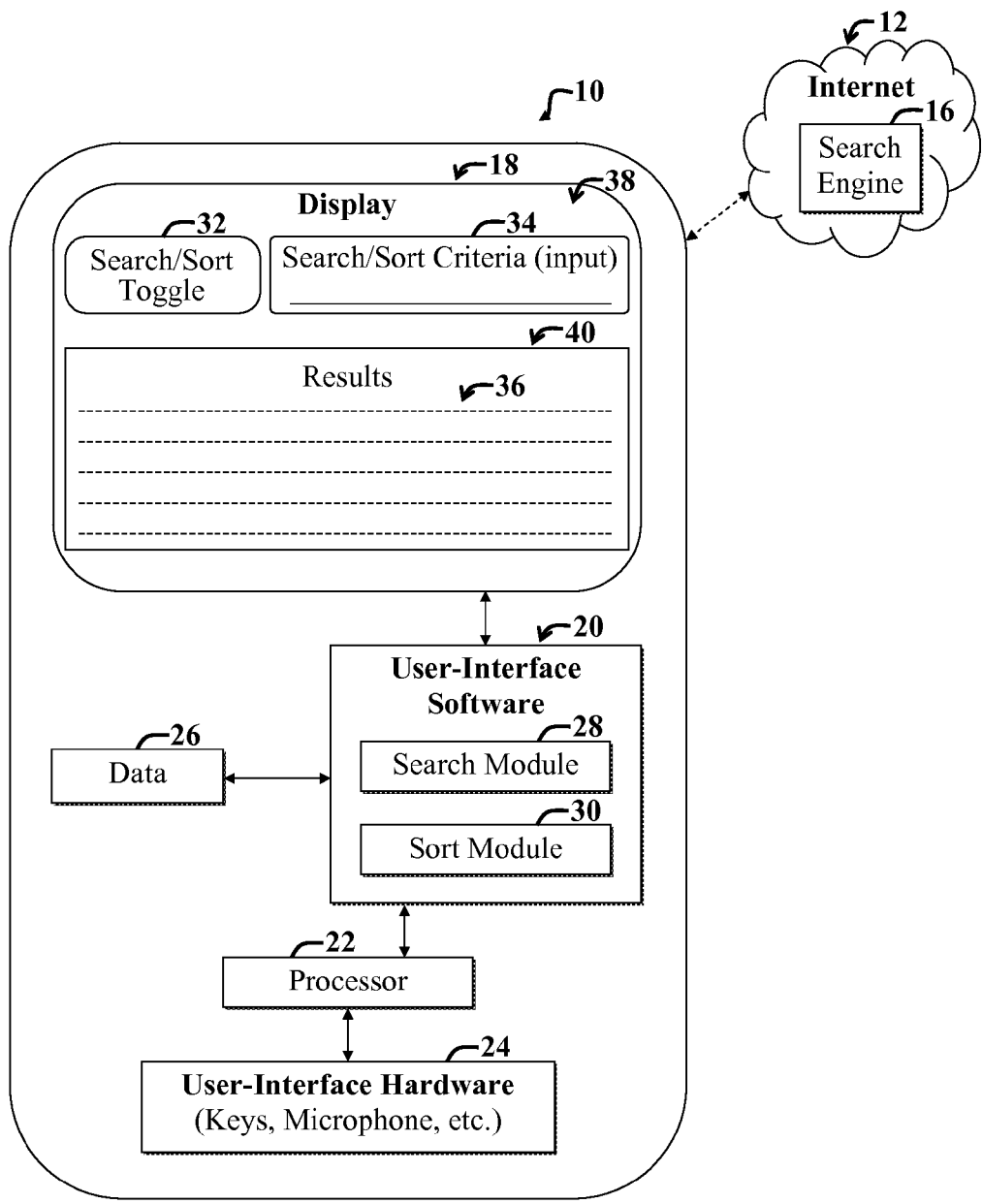
FIG. 1 is a diagram of an example portable computing device employing a graphical user interface that provides access to sort and search functionality via a toggle button according to a first embodiment.

FIG. 1 is a diagram illustrating an example portable computing device 10 that employs a graphical user interface 38 that provides access to sort and search functionality via a toggle button 32 according to a first embodiment. The portable computing device 10 may be a cellular telephone, a pocket computer, a mobile audio playback device, and/or other type of mobile computing device.

In the present example embodiment, the computing device 10 includes a processor 22 in communication with user-interface software 20. The user-interface software 20 communicates with a data-storage mechanism 26, such as a memory card. The user-interface software 20 is responsive to user input provided via user-interface hardware 24, which may include a keypad, stylus, microphone, hardware buttons, and/or other user-interface hardware. For example, in an alternative embodiment, the user-interface hardware 24 may be implemented via touch-screen functionality incorporated with a display screen 18. The exact choice of user-input hardware is application specific and may be altered to meet the needs of a given application without departing from the scope of the present teachings.

The user-interface software 20 communicates with the display screen 18 and is adapted to generate the graphical user interface 38. The graphical user interface 38 includes a software (as opposed to hardware) search/sort toggle button 32, a field for entering search and/or sort criteria 34, and an area 40 for displaying search results 36. The search results 36 may include sorted search results, as discussed more fully below. Search operations and sort operations initiated via the graphical user interface 38 are implemented, in part, via search functionality and sort functionality corresponding to a search module 28 and a sort module 30, respectively, included in the user-interface software 20, as discussed more fully below.

For the purposes of the present discussion, a module may be any grouping of functionality. Note that a grouping of functionality need not be physical. For example, functionality associated with a given module may be distributed among locations.

In operation, a user employs the search/sort toggle button 32 to toggle the input field 34 between a field that accepts search terms, i.e., search criteria, and a field that accepts sort criteria. Note that in another example embodiment, the search/sort toggle button 32 is implemented as two separate buttons instead of as one button, as discussed more fully below.

For the purposes of the present discussion, a toggle button may be any graphically displayed user-interface control that is adapted to switch a display screen from a first state to a second state or vice versa in response to selection of the button. For example, the first state may offer search controls, and the second display may offer sort controls.

A control may be any mechanism or graphical user interface feature that is responsive to user input to perform one or more functions. An example control includes a drop-down menu that enables a user to select from among various sort criteria. Another example control includes a search field, such as may selectively be implemented via the field 34, that is adapted to receive typed or written user input thereto. Note that typed user input may be any written text and need not necessarily be typed by a user. For example, voice-to-text functionality may be used to enter text in a search field without requiring a user to type the text.

In the present example operative scenario, a user employs the user-interface hardware 24 to select the search/sort toggle button 32 until the input field 34 becomes a search field, wherein the user may enter a query, i.e., search criterion. For the purposes of the present discussion, search criterion may be any information entered for the purposes of performing a search of data based on the information. An example search criterion includes a search term entered in a search field.

After the user enters a desired search query and activates the query, such as by selecting an enter key via the user-interface hardware 24, then a search of the data 26 is performed by the search functionality 28 of the user-interface software 20. Search results 36 are then displayed in a display area 40. In the present embodiment, the search results 36 are displayed simultaneously with graphical user-interface controls 32, 34, which may be toggled between search and sort controls by selection of the search/sort toggle button 32.

For the purposes of the present discussion, search functionality may be any function or set of functions adapted to facilitate searching data in accordance with a certain criterion or criteria. The criterion or criteria are called search criterion or criteria.

The user may then select the search/sort toggle button 32 to convert the input field 34 to a sort field, whereby a user may enter one or more sort criteria. A sort field and a search field represent search and sort controls, respectively.

For the purposes of the present discussion, a sort control may be any control or user interface feature that is adapted to enable a user to select, provide, or otherwise specify one or more sort criteria for sorting data. Similarly, a search control may be a user interface feature that is adapted to enable a user to select, provide, or otherwise specify one or more search criteria for searching data.

When the input field 34 is configured to act as a sort field, the graphical user interface 38 is said to be in sort mode. Similarly, when the input field 34 is configured to act as a search field, the graphical user interface 38 is said to be in search mode.

The sort field may be implemented via a user-configurable drop-down menu or other mechanism, as discussed more fully below. With search results 36 from a recent search displayed in the area 40, a user may effect sorting of the search results by selection of or entry of sort criteria in the input field 34. Upon selection of or entry of a desired sort criterion, the sort functionality 30 of the user-interface software 20 activates one or more routines for sorting the search results 36 in accordance with the selected sort criterion. The displayed search results 36 then represent sorted search results.

For the purposes of the present discussion, sort criteria may be any set of criterion adapted to specify how a list is to be ordered. An example sort criterion includes alphabetical, such that a list is to be sorted in alphabetical order. Similarly, sort functionality may be any function or set of functions adapted to facilitate sorting data in accordance with certain criterion or criteria. The criterion or criteria are called sort criterion or criteria, respectively.

By enabling toggling between the display of search and sort controls via the toggle button 32 while simultaneously displaying any search results 36 in the area 40, user context is preserved. This way, a user is less likely to forget what the search results were when deciding how to sort the search results. Furthermore, returning sorted search results may act to increase the usefulness of the relatively small display area 36 by indicating more important results first. In this way, a user may have improved ability to retrieve, access, and/or see desired information, which is obtained via selective searching and sorting of data.

In an alternative operative scenario, a search engine 16 that is accessible by the mobile computing device 10 via the Internet 12 is used to perform a search of data other than the data 26. The search engine 16 may return search results to the mobile computing device 10 for display in the results area 40. The returned results may then be sorted via the sort functionality 30 and associated user interface controls 32, 34.

Figure 2:
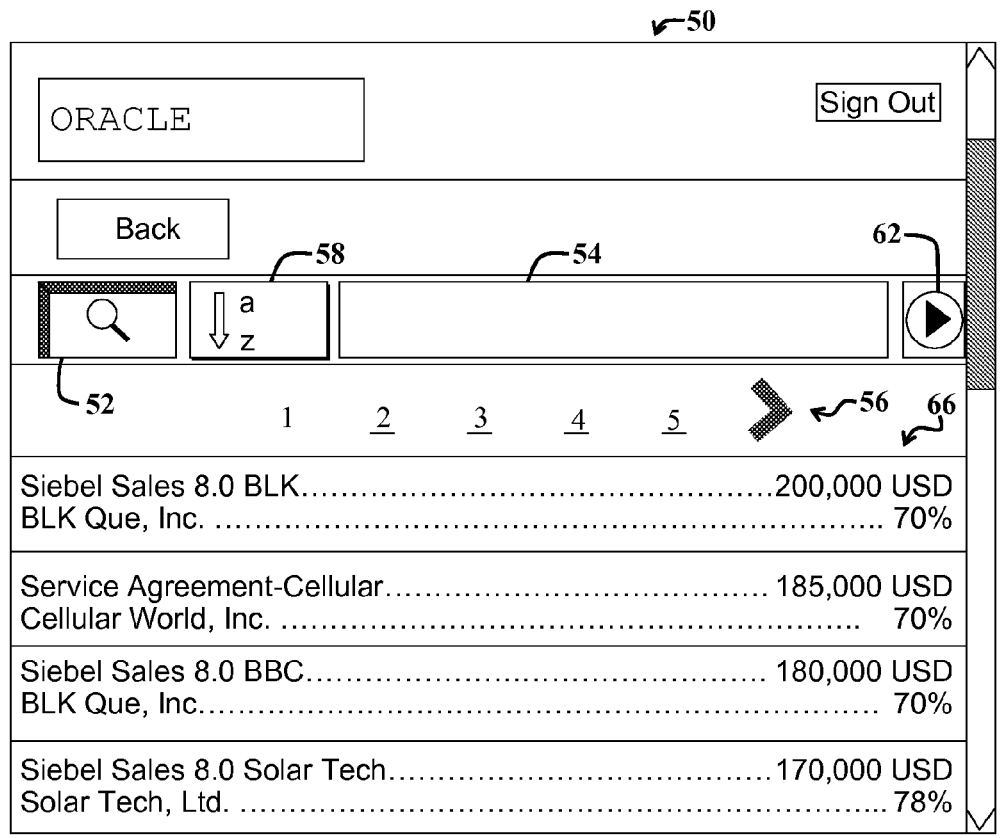
FIG. 2 is a diagram of a second example display screen that is usable with the portable computing device of FIG. 1 and that employs both search and sort toggle buttons.

FIG. 2 is a diagram of a second example display screen 50 that is usable with the portable computing device 10 of FIG. 1 and that employs both a search toggle button 52 and a sort toggle button 58. With reference to FIGS. 1 and 2, the second example display screen 50 may be implemented in part via the graphical user-interface software 20.

The present example display screen 50 is in search mode, as reflected by the search button 52, which is shown in a depressed state, and by the presence of an adjacent search field 54. The adjacent sort button 58 is shown in a popped-out state indicating that the display screen 50 is not in the sort state.

Text may be entered in the search field 54, and a search may be activated by selection of an enter control 62 that is displayed adjacent to the search field 54, as discussed more fully below. Example search results 66 from a previous search operation are shown below the toggle and search controls 52, 54, 58. Results-navigation links 56 are shown above the search results. The results-navigation links 56 are adapted to enable a user to navigate between different pages of the returned search results 66.

Figure 3:
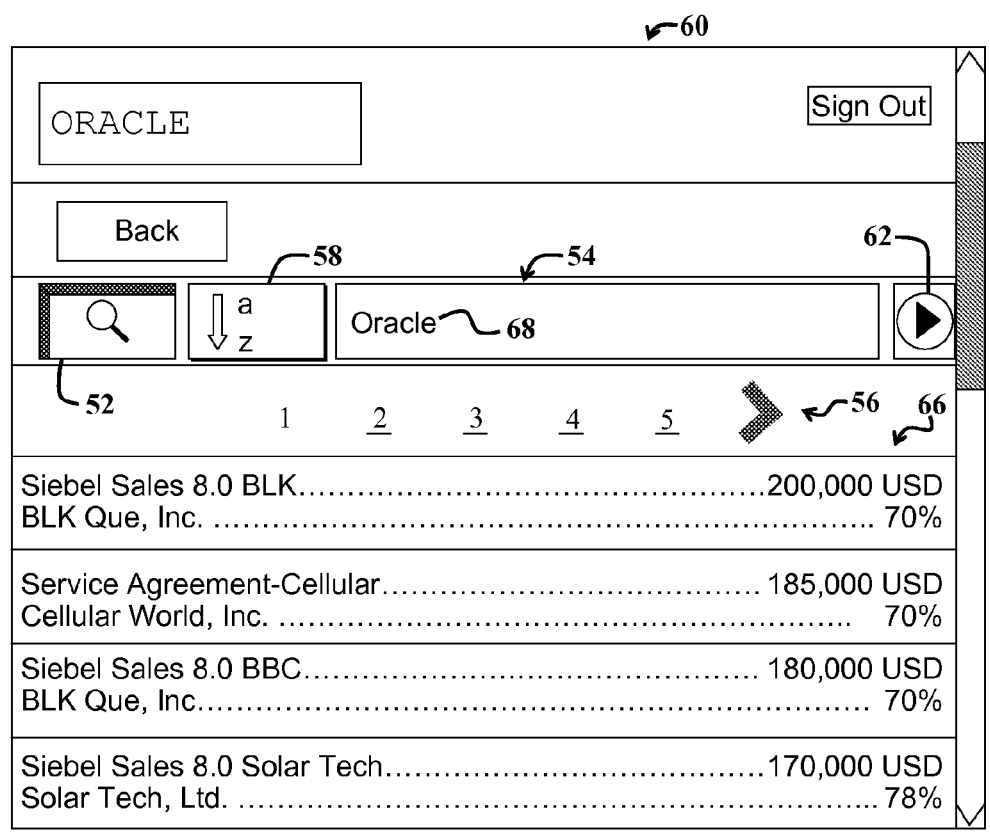
FIG. 3 is a diagram of a third example display screen illustrating entry of a search criterion, called query data, in a search field of the display screens of FIGS. 2 and 3.

FIG. 3 is a diagram of a third example display screen 60 illustrating entry of a search criterion 68, called query data, in a search field 68 of the display screens 50, 60 of FIGS. 2 and 3. The display screen 60 represents a similar graphical user interface as the graphical user interface corresponding to the display screen 50 of FIG. 2 with the exception of the entered example search criterion 68.

Figure 4:
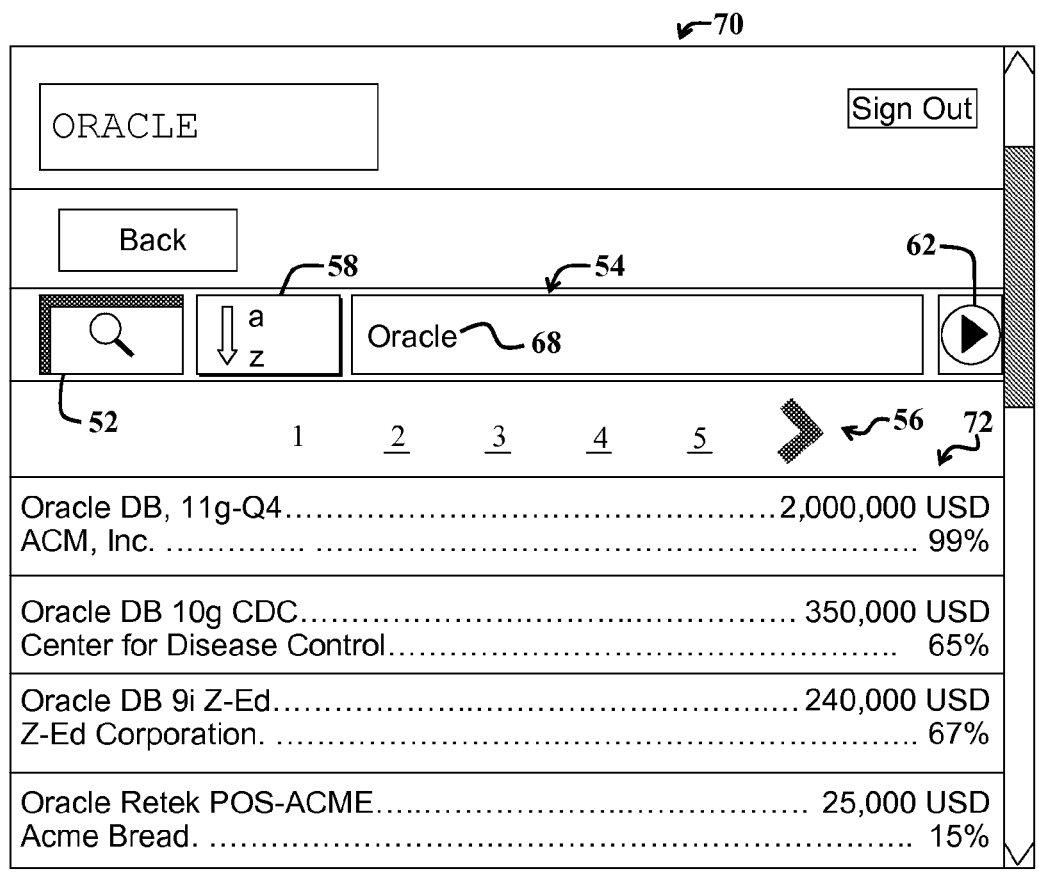
FIG. 4 is a diagram of a fourth example display screen illustrating search results obtained by entering the search criterion as shown in FIGS. 3 and 4 and activating the search.

FIG. 4 is a diagram of a fourth example display screen 70 illustrating example search results 72 obtained by entering the search criterion 68 as shown in FIGS. 3 and 4 and activating the search via selection of the enter control 62.

Note that, in the present example embodiment, if a user had selected a sort criterion when the associated user interface was in sort mode (before switching the user interface to search mode by selection of the search toggle button 52, as shown by the example screen 70), then the returned search results 72 would represent sorted search results that have been sorted according to the previously selected or entered sort criterion. Alternatively, or in addition, sorting of search results may occur after search results are displayed.

Figure 5:
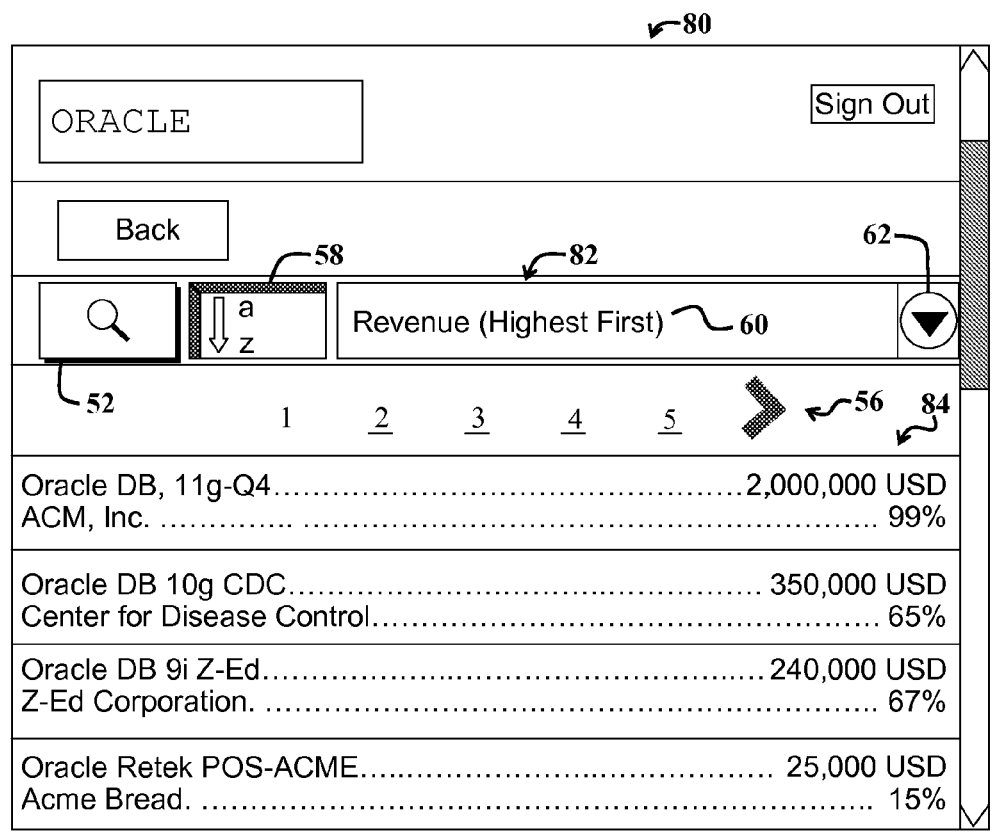
FIG. 5 is a diagram of a fifth example display screen illustrating selection of the sort toggle button of the display screens of FIGS. 2-5.

FIG. 5 is a diagram of a fifth example display screen 80 illustrating selection of the sort toggle button 58 of the display screens of FIGS. 2-5. The display of the sort toggle button 58 is shown depressed to indicate that the display screen 80 and associated graphical user interface represented thereby is in a sort state or mode. The sort state is further characterized by the display of a sort control 82, which is implemented as a drop-down menu in the present embodiment.

The presently selected sort criterion 60 is revenue (highest first). Accordingly, displayed sorted search results 84 are sorted in decreasing order of associated revenue. Activation of the sort functionality represented by the sort module 30 of the user interface software 20 of FIG. 1 may occur automatically in response to selection of a criterion from the drop-down menu 82.

The drop-down menu 82 represents an example sort control. Note that other types of controls for entering or selecting sort criteria may be employed without departing from the scope of the present teachings. For example, the drop-down menu 82 may be configured to enable typing of sort command-line options in the field that currently displays the sort criterion 60.

In an alternative embodiment, the drop down menu 82 includes one or more mechanisms for facilitating selection of sort criteria that specifies groupings of sorted data, sort options for sorting data within each group, and sort options for ordering returned groups of search results, and so on. For example, a command-line entry might specify that returned results be grouped according to a region associated with each returned company listing, where each company in a given region is sorted by revenue received. Those skilled in the art with access to the present teachings may readily implement such functionality and associated user-interface control features without undue experimentation and without departing from the scope of the present teachings.

Figure 6:
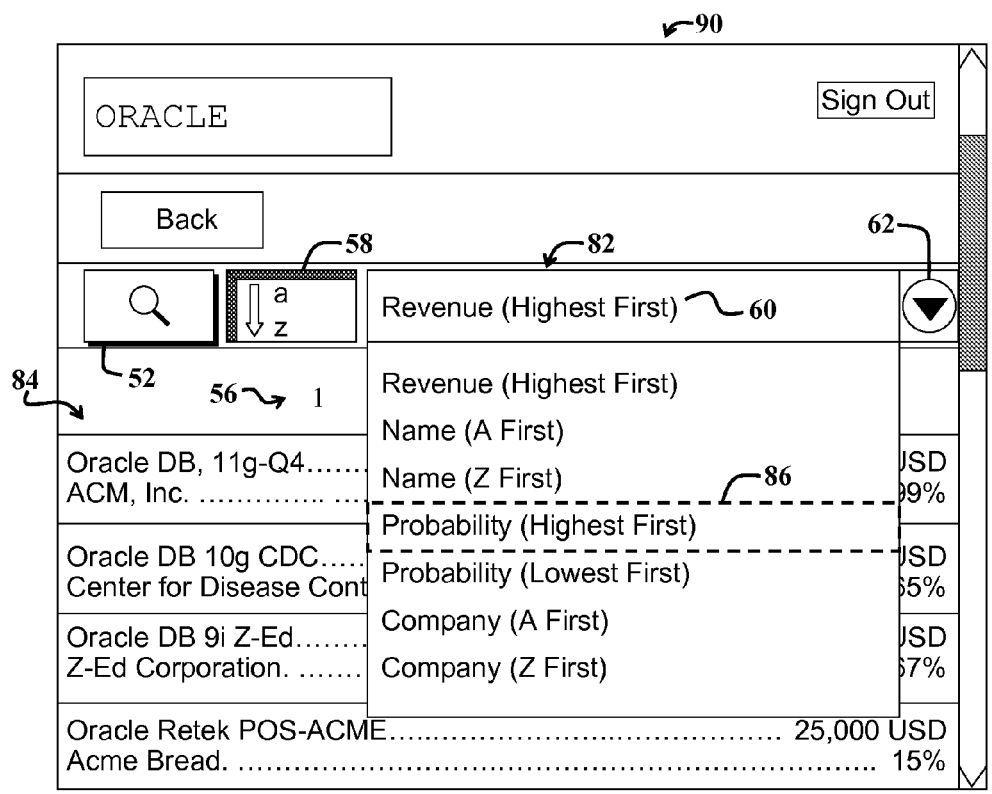
FIG. 6 is a diagram of a sixth example display screen illustrating selection of a sort criterion from the drop-down menu of FIGS. 5 and 6.

FIG. 6 is a diagram of a sixth example display screen 90 illustrating selection of a sort criterion 86 from the drop-down menu 82 of FIGS. 5 and 6. In the present example, the sort criterion 86 includes probability (highest first), such that returned search results will be displayed in accordance with decreasing probabilities associated therewith.

Note that various search and sort criteria discussed herein are merely examples and that other criterion, such as more complex criterion may be employed. Such criterion may be application—specific and data-specific such that criterion may change depending on the type of data or other characteristics of data to be searched and sorted.

Figure 7:
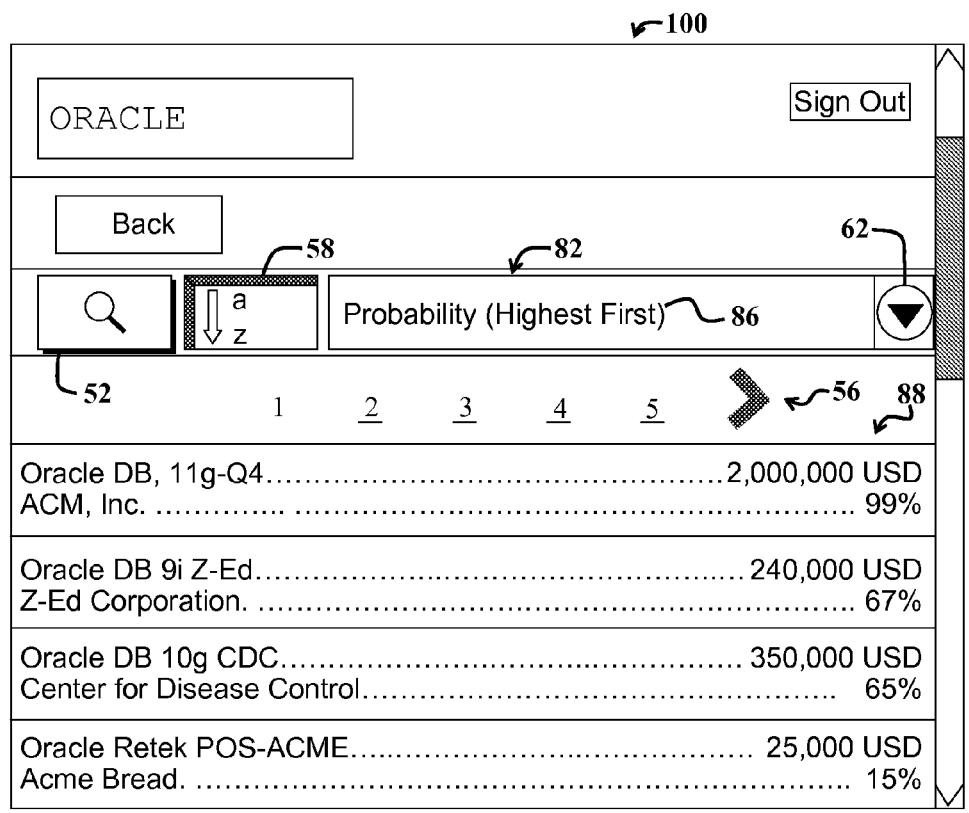
FIG. 7 is a diagram of a seventh example display screen illustrating sorted data after activation of a sort operation in accordance with the sort criterion shown selected in FIGS. 6 and 7.

FIG. 7 is a diagram of a seventh example display screen 100 illustrating sorted data 88 after activation of a sort operation in accordance with the sort criterion 86 shown selected in FIGS. 6 and 7. The example sorted search results 88 are sorted in order of decreasing probability value, where a predetermined probability value has previously been assigned to each data element, i.e., result, of the returned sorted search results 88. The sorted search results 88 are displayed simultaneously with the toggle buttons 52, 58 and the drop-down menu sort control 82 to facilitate preserving context.

While the display screens 50, 60, 70, 80, 90, 100 of FIGS. 2-7 are shown returning search results from a corporate database query, note that embodiments are not limited thereto. Any data or listing may be selectively searched and/or sorted via a graphical user interface that employs one or more features for toggling between operational modes, including search and sort operational modes, in accordance with the present teachings.

Note that the sorted search results 88 will be displayed simultaneously with search controls (as opposed to toggle controls) if the user selects the search button 52 from the display screen 100. The user may then perform another search. Optionally, the subsequent search results will be automatically sorted based on the previously selected sort criterion 86. Alternatively, the subsequent search results will be unsorted until subsequent selection of a sort criterion after selecting the sort control 58. Alternatively, search results may be automatically sorted based on a default sort criterion, e.g., in absence of another user-selected sort criterion. Similarly, a default search criterion may be provided in the field 54 of FIG. 4. Such default criteria (default search and sort criteria) may be user modifiable. Furthermore, note that upon entry to the screen 70, default search results may be displayed without requiring user selection of the enter control 62. For example, upon selection of a link (not shown) to a user's SALES LEADS, the user's sales leads may be subsequently listed (e.g., via the screen 100) with accompanying search/sort toggle controls, and the listed sales leads may be automatically sorted based on a default sort criterion. Hence, in certain implementations, a user need not execute a search via the search control 52 and search field 54 of FIG. 4 to get sortable data. For example, a predetermined default search and/or sort operation may be executed in response to selection of a link to particular data.

Figure 8:
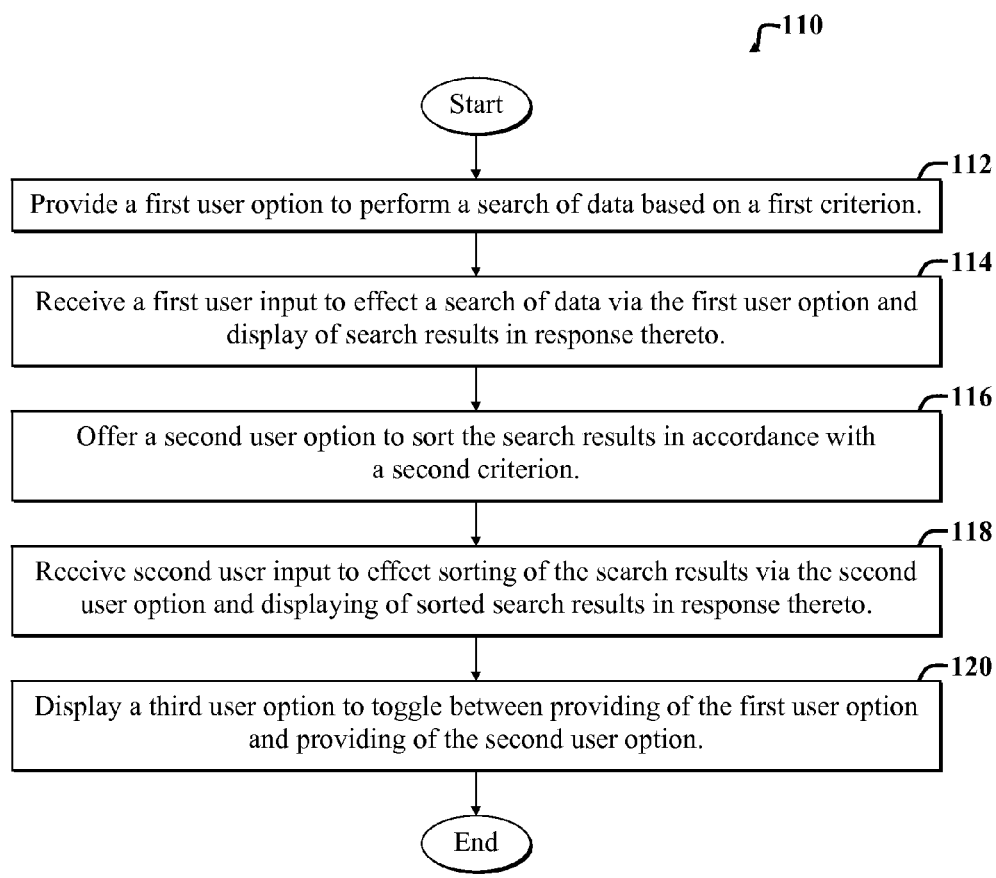
FIG. 8 is a flow diagram of an example method that is adapted for use with the portable computing device of FIG. 1 and the user-interface display screens of FIGS. 2-7.

FIG. 8 is a flow diagram of a method 110 that is adapted for use with the portable computing device 10 of FIG. 1 and the user-interface display screens 50, 60, 70, 80, 90, 100 of FIGS. 2-7. The example method 110 includes a first step 112 that includes providing a first user option to perform a search of data based on a first criterion.

A second step 114 includes receiving first user input, such as selection of an enter control or key, to effect a search of data via the first user option and displaying of search results in response thereto. Note that default search and/or sort results and corresponding default search and/or sort criteria may be provided in advance of steps 112 and 114.

A third step 116 includes offering a second user option to sort the search results in accordance with a second criterion.

A fourth step 118 includes receiving second user input, such as selection of an item from a drop-down menu, to effect sorting of the search results via the second user option and displaying of sorted search results in response thereto.

A fifth step 120 includes displaying a third user option to toggle between providing of the first user option and providing of the second user option.

Note that the method 110 is illustrative and may be altered without departing from the scope of the present teachings. For example, certain steps may be rearranged, omitted, and/or additional steps or details may be added. For example, the display of the third user option may specifically include display of one or more toggle buttons that are adapted to cause switching between displaying of a first mechanism, i.e., search control, for entering one or more search criteria and displaying of a second mechanism, i.e., sort control, for entering one or more sorting criteria. The search control may include a field that is adapted to receive written text. The sort control may include a drop-down menu that is adapted to enable a user to select a sort criterion from a predetermined list of sort criteria. The display of one or more search controls and/or sort controls may occur simultaneously with the display of any search results, which may be sorted or unsorted, depending upon whether sort functionality has been applied to the search results.

The various embodiments described herein may be adapted to run on various processing systems, such as one or more computers. A data storage device, such as hard drive, may accommodate storage of data in the databases and/or storage of computer readable instructions for implementing various functionality described herein.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

We claim:

1. A method, performed by a processor, for facilitating access to desired data, the method comprising:
    displaying, using the processor, a graphical user interface (GUI) including a search criteria/sort criteria display area, an input field, located in the search criteria/sort criteria display area, to accept search and sort criteria from a user input device, a toggle control display area, a toggle control, in the toggle control display area, where the toggle control controls the input field type of the input field to accept search or sort criteria from the user input device, wherein if the toggle control is set to a first input field type, the input field accepts only search criteria and if the toggle control is set to a second input field type, the same input field accepts only sort criteria, and wherein the input field which accepts the search criteria and sort criteria is the same input field in the search criteria/sort criteria display area, an enter control, located in an enter control area, that accepts input from a user input device and a results display area not included in the search criteria/sort criteria display area;

obtaining search results, using the processor and in response to input accepted by the enter control, where the search results are based on one or more search criteria accepted by the input field;

displaying, using the processor, obtained search results in the results display area of the GUI, while simultaneously allowing one or more sort criteria to be displayed in the input field to preserve context to allow viewing of search results while selecting sort criteria; and obtaining sorted search results, using the processor and in response input accepted by the enter control, where the sorted search results are based on a selected sort criteria accepted by the input field.

2. The method of claim 1 where displaying the toggle control display area includes displaying a search selecting display area and a sort selecting display area where a search control is displayed in the search selecting display area and a sort control is displayed in the sort selecting display area.

3. The method of claim 1 further including displaying sorted search results simultaneously with display of one or more accepted search criteria subsequent to display of one or more sort criteria.

4. The method of claim 1 further including displaying one or more sort criteria for sorting one or more search results subsequent to initially displaying search criteria.

5. The method of claim 4, further including displaying one or more search criteria after selection of a different sort criterion.

6. The method of claim 5 further including displaying sorted search results simultaneously with one or more search criteria after a sort criterion have been previously selected.

7. A system for selectively searching and sorting data, the system comprising:

a display;

data to be searched;

a user input device;

a user interface software module that displays, via the display, a graphical user interface (GUI) including a search criteria/sort criteria display area, an input field, located in the search criteria/sort criteria display area, to accept search and sort criteria from a user input device, a toggle control display area, a toggle control, in the toggle control display area, where the toggle control controls the input field type of the input field to accept search or sort criteria from the user input device, wherein if the toggle control is set to a first input field type, the input field accepts only search criteria and if the toggle control is set to a second input field type, the same input field accepts only sort criteria, and wherein the input field which accepts the search criteria and sort criteria is the same input field in the search criteria/sort criteria display area, an enter control, located in an enter control area, that accepts input from the user input device and a results display area not included in the search criteria/sort criteria display area; and where the user interface software module obtains search results, in response to input accepted by the enter control, where the search results are based on one or more search criteria accepted by the input field, displays obtained search results in the results display area of the GUI, while simultaneously allowing one or more sort criteria to be accepted by and displayed in the input field to preserve context to allow the user to view search results while selecting sort criteria and obtains sorted search results in response to input accepted by the enter control, where the sorted search results are based on a selected sort criteria accepted by the input field.

8. The system of claim 7, wherein the system includes a mobile computing device running software to implement the user interface software module.

\* \* \* \* \*